US009481017B2

(12) United States Patent
Adler et al.

(10) Patent No.: US 9,481,017 B2
(45) Date of Patent: Nov. 1, 2016

(54) RAMP CLEANING DEVICE FOR SOLAR ENERGY TECHNOLOGIES

(76) Inventors: Jeffrey Scott Adler, Beaconsfield (CA); Harold Russell Baird, Marietta, GA (US)

( * ) Notice: Subject to any disclaimer, the term of this patent is extended or adjusted under 35 U.S.C. 154(b) by 1120 days.

(21) Appl. No.: 13/507,957

(22) Filed: Aug. 9, 2012

(65) Prior Publication Data

US 2014/0041698 A1    Feb. 13, 2014

(51) Int. Cl.
| B08B 7/04 | (2006.01) |
| B08B 1/00 | (2006.01) |
| F24J 2/46 | (2006.01) |
| F24J 2/40 | (2006.01) |
| F24J 2/14 | (2006.01) |
| F24J 2/20 | (2006.01) |

(52) U.S. Cl.
CPC .................. B08B 1/008 (2013.01); F24J 2/40 (2013.01); F24J 2/461 (2013.01); F24J 2/14 (2013.01); F24J 2/20 (2013.01); Y02E 10/40 (2013.01)

(58) Field of Classification Search
CPC ........... A47L 1/02; A02S 4/10; B08B 1/008; F24J 2/40; F24J 2/461; F24J 2/14; F24J 2/20; Y02E 10/40
See application file for complete search history.

(56) References Cited

U.S. PATENT DOCUMENTS

| 5,655,247 A * | 8/1997 | Allen .................... A47L 1/02 15/103 |
| 7,503,091 B2 * | 3/2009 | White, Jr. ............ A47L 1/02 15/103 |
| 7,576,658 B2 * | 8/2009 | Ishikawa ............ B60S 1/0818 15/250.001 |
| 2010/0043870 A1 | 2/2010 | Bennett et al. |
| 2010/0206379 A1 * | 8/2010 | Littau .................... F24J 2/06 136/259 |

FOREIGN PATENT DOCUMENTS

| CN | 201721424 U | * 1/2011 |
| CN | 202461076 U | * 10/2012 |
| EP | 2048455 A2 | 4/2009 |
| EP | 2 236 954 A2 | 10/2010 |
| GB | 2 358 843 A | 8/2001 |
| JP | 2004 039753 A | 2/2004 |
| JP | 2010/161141 | 7/2010 |
| JP | 2011 009672 A | 1/2011 |
| WO | WO 2011/141892 | 5/2010 |

* cited by examiner

*Primary Examiner* — Shay Karls

(57) ABSTRACT

Described herein is a cleaning device for a flat solar panel or a trough reflector panel. The device comprises a cleaning member with a sweeper portion and a scraper portion. The cleaning member is mounted for unidirectional and bidirectional movement over the flat panel or the reflector panel. A rocker bar is connected to the sweeper portion and the scraper portion to rockingly move either the sweeper portion or the scraper portion into contact with the flat panel or the reflector panel as the cleaning member moves over the flat panel or the reflector panel.

87 Claims, 13 Drawing Sheets

RAMP CLEANING DEVICE FOR SOLAR ENERGY TECHNOLOGIES

TECHNICAL FIELD

The present relates to autonomous cleaning devices, and more particularly to an autonomous ramp device for cleaning a trough reflector panel and a flat solar panel.

BACKGROUND

Solar panels are now commonplace as efficient, clean energy sources. Flat panels typically contain a protective transparent cover over a photovoltaic array which converts solar energy to usable electrical power. Curved reflector panels, also commonly referred to as a solar reflector panel or as a trough solar panel reflects incoming solar energy to a concentrated area where a collector is located. The collector may be a thermal type which heats a liquid or air, a photovoltaic surface which generates electricity, or a combination of both. During use, the transparent cover or reflector surface may become dirty as a result of an accumulation of: dust, soil, tree debris, sand, moss, dirt, sap, bugs, bird droppings, water spots and build up or mold, and the like, thereby significantly reducing the panel efficiency. In solar and trough reflector parks, where multiple panels are located, often in remote areas, routine cleaning is labor intensive, requiring cleaning crews to clean the panels several times per month at considerable cost. Furthermore, where solar panels are mounted high, for example on residential or commercial rooftops, the cleaning crews risk serious injury from falls.

Several solar panel cleaning devices are known and have been used with limited success to address the above noted problems. For example, many known cleaning systems use a water reservoir to spray the solar panel with a flocculent solution, but these are largely ineffective at cleaning the solar panels and are considered to be environmentally unfriendly. One additional device described in European patent application number EP2048455A2 to Diaz et al for "Automatic Solar Panel Cleaning System" uses roller cleaning brushes which, when activated by a rain sensor, roll across the surface of the solar panels to sweep away the debris which has accumulated thereon. The system of Diaz, while straightforward to operate, suffers from several important disadvantages. The roller brushes merely brush the debris along the surface of the solar panels and may leave behind residual debris. Furthermore, the rain sensor does not detect rain intensity; therefore it is likely that the system of Diaz would be less effective, since it is not designed to take advantage of the cleansing assist that adequate rain intensity provides.

Thus, there is a need for an improved solar technology cleaning device which addresses the above-noted problems.

BRIEF SUMMARY

We have designed a solar panel and trough reflector panel (also known as parabolic solar panel) cleaning device and system which can be either an after-market assembly attached to different size panels, or incorporated into a production design. The system senses the presence of rain intensity thereon and autonomously cleans the panel using a combination of cleaning inserts, which may be pads, wipers or brushes. Advantageously, the cleaning inserts can be easily removed and replaced during routine maintenance, and trimmed to the panel size. If desired, the cleaning inserts can be interchanged to suit the needs of the particular environment. Moreover, the device does not require connection to an external fluid source, such as a fluid reservoir, but in arid climates can be teamed with such technology including user supplied or precipitation gathering systems or devices. The cleaning cycle may be bi-directional, or uni-directional. The uni-directional mode can be selected for use in environments where there is diminished solar power output, diminished rainfall, or in less dirty environments.

In these cases, sufficient cleaning can realized with a single direction cleaning, which does not require the cleaning member to move in both the first and second directions. In both cases of the flat solar panels or trough reflector panels, our cleaning device can be retrofittable to existing panels.

Accordingly in one aspect, there is provided a cleaning device for solar energy technology, the device comprising:

a cleaning member having a sweeper portion and a scraper portion, the cleaning member being mounted for unidirectional and bidirectional movement over the panel; and a rocker bar connected to the sweeper portion and the scraper portion for rockingly moving either the sweeper portion or the scraper portion into contact with the panel as the cleaning member moves over the panel.

In one example, the rocker bar includes an upper rocker bar and a lower rocker bar connected to the sweeper portion and the scraper portion, each rocker bar having a rocker pin about which the upper and lower rocker bars rockingly move.

In one example, the cleaning member moves over the panel along a restricted path of travel.

In one example, the device further includes at least two spaced apart ramps. The scraper portion or the sweeper portion cleaning member moves up the respective ramps when the cleaning member moves unidirectionally or bidirectionally, the ramps forcing the cleaning member to tilt so that either the scraper portion or the sweeper portion contacts the panel. Unidirectional movement of the cleaning member is abbreviated to avoid contacting the ramps so that the scraper portion is always in contact with the panel.

In one example, the cleaning member is movably mounted on the sides of a frame. The frame includes a drive assembly to drive the cleaning member across the panel.

In one example, the drive assembly includes:
a) at least one drive shaft;
b) a gear connected to the drive shaft; and
c) a prime mover connected to the gear.

In one example, the drive assembly includes one drive shaft in a shaft enclosure. The drive assembly includes two drive shafts disposed substantially parallel to each other. The two drive shafts are respectively enclosed in two shaft enclosures. The drive assembly includes a guide having a guide slot therein, the guide being located substantially parallel to the drive shaft. A cross shaft connects the two drive shafts.

In one example, the device further includes one or more mounting straps and a mounting buckle or a clamp for locating the device over the panel.

In one example, a moisture intensity sensor is in communication with the cleaning member, the moisture intensity sensor being located adjacent the panel or integral therewith. The moisture intensity sensor is a rain sensor.

In one example, a temperature sensor is in communication with the cleaning member, the temperature sensor being located adjacent the panel.

In one example, a controller is connected to a moisture intensity sensor and a temperature sensor, the controller being powered by a power supply. The power supply is an autonomous power supply. The autonomous power supply is a photovoltaic cell array or a trough reflector or a battery or user supplied power.

In one example, the device is located on a pedestal or frame.

In one example, the device is mounted on the roof, the side of a building or on the ground.

In one example, the device is connected to a washing system for spraying a liquid on a trough reflector or a flat solar panel or allowing collected rainwater from drainage channels along a frame to be implemented.

In one example, the panel is flat solar panel.

In one example, the panel is a curved trough reflector panel.

According to another aspect, there is provided a cleaning device for a curved trough reflector panel, the device comprising:
 a cleaning member having a sweeper portion and a scraper portion, the cleaning member being mounted for unidirectional and bidirectional movement over the curved reflector panel; and
 a rocker bar connected to the sweeper portion and the scraper portion for rockingly moving either the sweeper portion or the scraper portion into contact with the curved reflector panel as the cleaning member moves over the curved reflector panel.

According to another aspect, there is provided a cleaning device for a curved reflector panel, the device comprising:
 a cleaning member mounted for unidirectional movement over the curved reflector panel, the cleaning member having a sweeper portion for cleaning the curved reflector panel as the cleaning member moves unidirectionally along a restricted path of travel.

According to another aspect, there is provided a system for autonomously cleaning a curved reflector panel, the system comprising:
 a moisture intensity sensor;
 a temperature sensor;
 a controller in communication with the sensors; and
 a cleaning member mounted for unidirectional movement or bidirectional movement over the curved reflector panel, the cleaning member being in communication with the controller, the cleaning member having a sweeper portion and a scraper portion, the system being configured such that in response to an amount of moisture being detected on the moisture intensity sensor the controller activates the cleaning member such that: i) the cleaning member moves unidirectionally and the sweeper portion cleans the curved reflector panel; or ii) the cleaning member moves bidirectionally and the sweeper portion cleans the curved reflector panel; and the cleaning member tilts so that the scraper portion is brought into contact with the curved reflector panel and the scraper portion cleans the curved reflector panel.

According to another aspect, there is provided a system for autonomously cleaning a curved reflector panel, the system comprising:
 a moisture intensity sensor;
 a temperature sensor;
 a controller in communication with the sensors; and
 a cleaning member mounted for movement in one direction over the curved reflector panel, the cleaning member being in communication with the controller, the cleaning member having a sweeper portion, the system being configured such that in response to an amount of moisture being detected on the moisture intensity sensor, the controller activates the cleaning member such that the cleaning member moves in the one direction along a restricted path of travel and the sweeper cleans the curved reflector panel.

According to another aspect, there is provided a cleaning device for a flat solar panel, the device comprising:
 a cleaning member having a sweeper portion and a scraper portion, the cleaning member being mounted for unidirectional and bidirectional movement over the flat solar panel; and
 a rocker bar connected to the sweeper portion and the scraper portion for rockingly moving either the sweeper portion or the scraper portion into contact with the flat solar panel as the cleaning member moves over the flat solar panel.

According to another aspect, there is provided a cleaning device for a flat solar panel, the device comprising:
 a cleaning member mounted for unidirectional movement over the flat solar panel, the cleaning member having a sweeper portion for cleaning the flat solar panel as the cleaning member moves unidirectionally along a restricted path of travel.

According to another aspect, there is provided a system for autonomously cleaning a flat solar panel, the system comprising:
 a moisture intensity sensor;
 a temperature sensor;
 a controller in communication with the sensors; and
 a cleaning member mounted for unidirectional movement or bidirectional movement over the flat solar panel, the cleaning member being in communication with the controller, the cleaning member having a sweeper portion and a scraper portion, the system being configured such that in response to an amount of moisture being detected on the moisture intensity sensor the controller activates the cleaning member such that: i) the cleaning member moves unidirectionally and the sweeper portion cleans the flat solar panel; or ii) the cleaning member moves bidirectionally and the sweeper portion cleans the flat solar panel; and the cleaning member tilts so that the scraper portion is brought into contact with the flat solar panel so as to clean it.

According to another aspect, there is provided a system for autonomously cleaning a flat solar panel, the system comprising:
 a moisture intensity sensor;
 a temperature sensor;
 a controller in communication with the sensors; and
 a cleaning member mounted for movement in one direction over the flat solar panel, the cleaning member being in communication with the controller, the cleaning member having a sweeper portion, the system being configured such that in response to an amount of moisture being detected on the moisture intensity sensor, the controller activates the cleaning member such that the cleaning member moves in the one direction along a restricted path of travel and the sweeper cleans the flat solar panel.

BRIEF DESCRIPTION OF THE DRAWINGS

In order that the discovery may be readily understood, embodiments are illustrated by way of example in the accompanying drawings.

Further details of the device and its advantages will be apparent from the detailed description included below.

DETAILED DESCRIPTION

As used herein, the term "solar energy technology" is intended to mean either a curved reflector panel or a flat solar panel.

I. Curved Trough Reflectors

Figure 1:
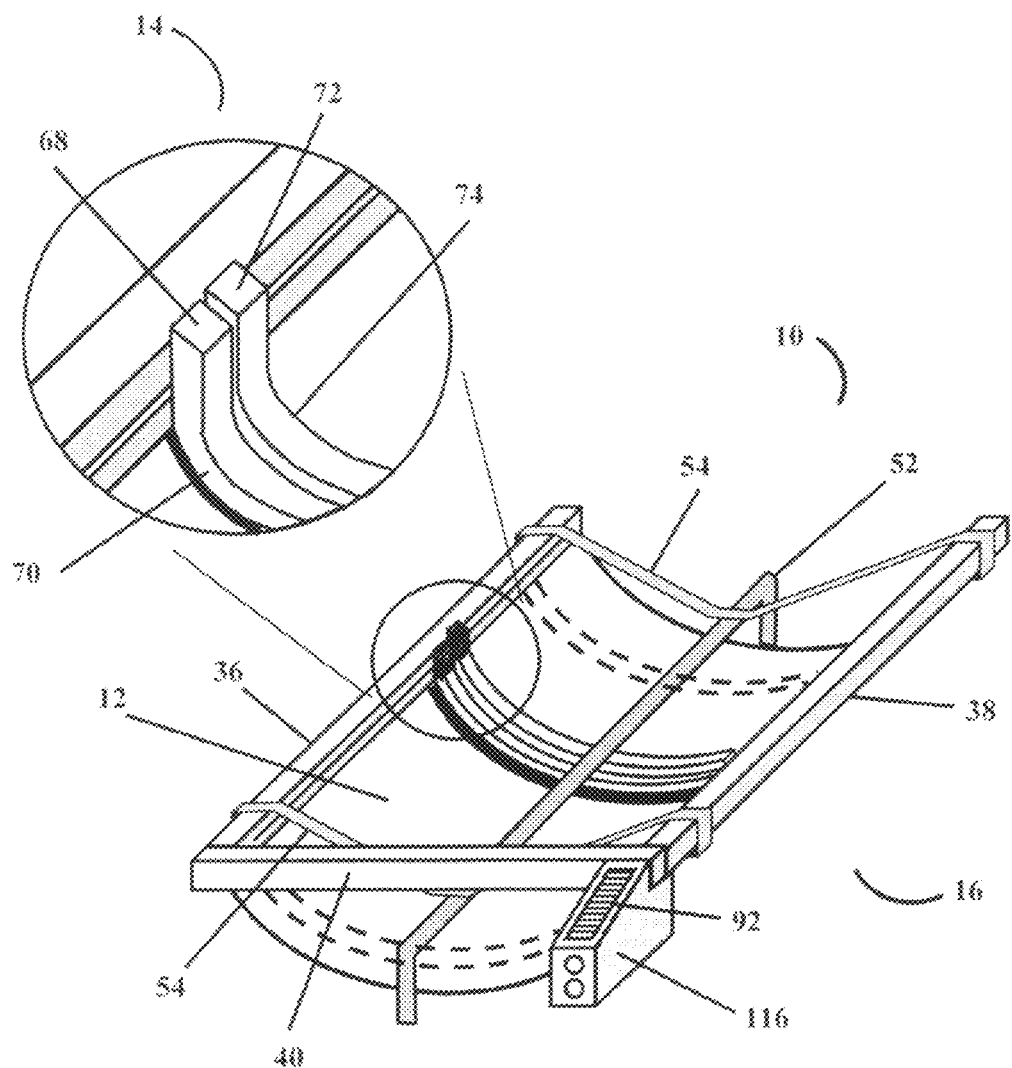
FIG. 1 is a perspective view of a dual drive cleaning device mounted on a curved reflector panel.

Referring now to FIG. 1, an autonomous cleaning device and system for a trough reflector panel is shown generally at 10. In the example illustrated, the device 10 is mounted over a curved trough reflector 12. The device 10 and the curved trough reflector 12 may be located on a pedestal or frame such as in a trough reflector park or may be located on the side or rooftop of a residential or commercial building or on the ground. A person skilled in the art will recognize that although a single trough reflector is referred to throughout, it is to be understood that a plurality of devices 10 may also be used with a plurality of curved trough reflectors 12. The device 10 can be used for solar thermal applications such as passive water and air heaters, steam turbines, air conditioning, desalination plants, and the like, and also where the reflector is used as a solar radiation concentrator in mixed photovoltaic/thermal applications. Effectively this solar trough technology focuses solar energy to a central line along the trough where a collector pipe 52 transfers the energy away to an external collector. This solar trough system can be used with the device 10 to maximize the energy produced. The central line where the trough is focusing its reflection is raised above the reflector structure, thereby providing reasonable space to allow the device 10 to operate in a uni or bidirectional cleaning operation on the surface of the reflector. Curved trough reflectors have the same efficacy concerns as conventional solar panels with regard to the ability to provide the maximum energy when the panels or reflectors are clean. In fact, curved reflectors are normally placed in high sun, desert conditions whereby there is a high propensity for sand, dust and dirt to build up on the apparatus thereby creating a need to clean on a regular basis.

Generally speaking, the device 10 comprises a cleaning member 14 that is mounted for movement over the curved trough reflector 12 in one direction (uni-directional) or two opposite directions (bi-directional), along generally longitudinal or lateral paths of travel, to clean substantially the entire surface of the trough reflector. The nature of the autonomous device and system includes the ability of the controller and sensors to harness the power from which the device is attached thereto, or from a nearby device, including user supply AC power, a solar voltaic panel, trough reflector panel or an optional battery pack that may or may not be charged by the trough reflector panel (for single trough reflector site assemblies) for example, and subsequently power the cleaning assembly in a cleaning cycle whereby a one or two directional cleaning may be required. When required, the cleaning device 10 can be connected to a washing system. The washing system may include a liquid such as water or detergent, which is sprayed onto the trough reflector as a supplement to, or in lieu of, natural rainfall.

Figure 2:
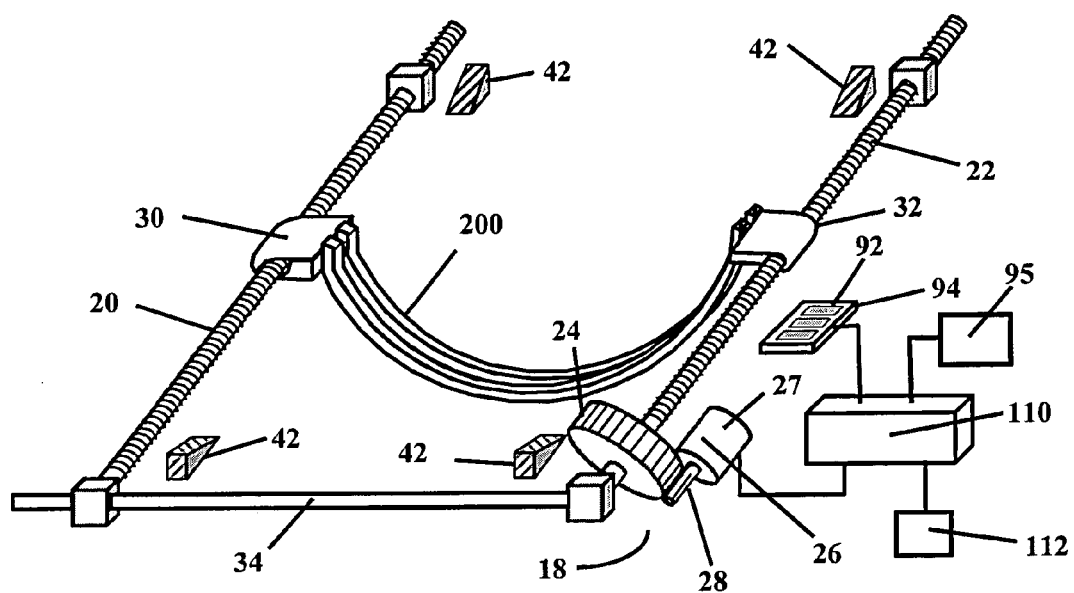
FIG. 2 is a schematic illustration of a dual drive cleaning device for a curved reflector panel.

Referring now to FIGS. 1 and 2, to permit movement in the one or two directions, the cleaning member 14 is movably mounted on a generally square or rectangular frame 16. The dimensions and shape of the frame 16 depend on the dimensions and shape of the curved trough reflector 12 to be cleaned, although generally speaking the frame 16 is either square or rectangular. The frame 16 includes a drive assembly 18, which drives the cleaning member 14 across the trough reflector 12 during a cleaning operation. In one example, the drive assembly 18 is a dual drive assembly and includes two threaded drive shafts 20, 22, which are disposed substantially parallel to each other. A toothed gear wheel 24 is connected to one end of the drive shaft 22, although in some examples, two gear wheels can be connected, one on each of the drive shafts. A prime mover 26, such as a drive motor 27, includes a toothed portion 28 which meshes with the gear wheel 24 teeth to drive the gear wheel 24 and therefore the drive shaft 22. The cleaning member 14 includes two driven end portions 30, 32 which are mounted on each of the threaded drive shafts 20, 22 for movement therealong when the drive motor 26 is activated. One or more cross shafts 34 are connected between the two drive shafts 20, 22 to transfer rotation to drive shaft 20 and add rigidity and stability to the drive assembly 18. The two drive shafts 20, 22 are respectively housed within two shaft enclosures 36, 38, and the cross shafts 34 are housed within a cross shaft enclosure 40.

The cleaning device 10 also includes spaced apart tilt ramps 42, which are located at either end of the frame 16. The tilt ramps 42 are wedges in which the thin ends are disposed towards the cleaning member 14 and contact the cleaning member 14 as it reaches the respective ends of the curved trough reflector 12.

The cleaning member 14 can be mounted for movement in one direction only over the curved trough reflector 12. In this case, the cleaning member 14 moves in the first direction along a restricted path of travel. In the first direction only movement, the movement of the cleaning member 14 is abbreviated to avoid contacting the tilt ramps 42 so that the first cleaning portion is always in contact with the trough reflector 12.

Figure 3:
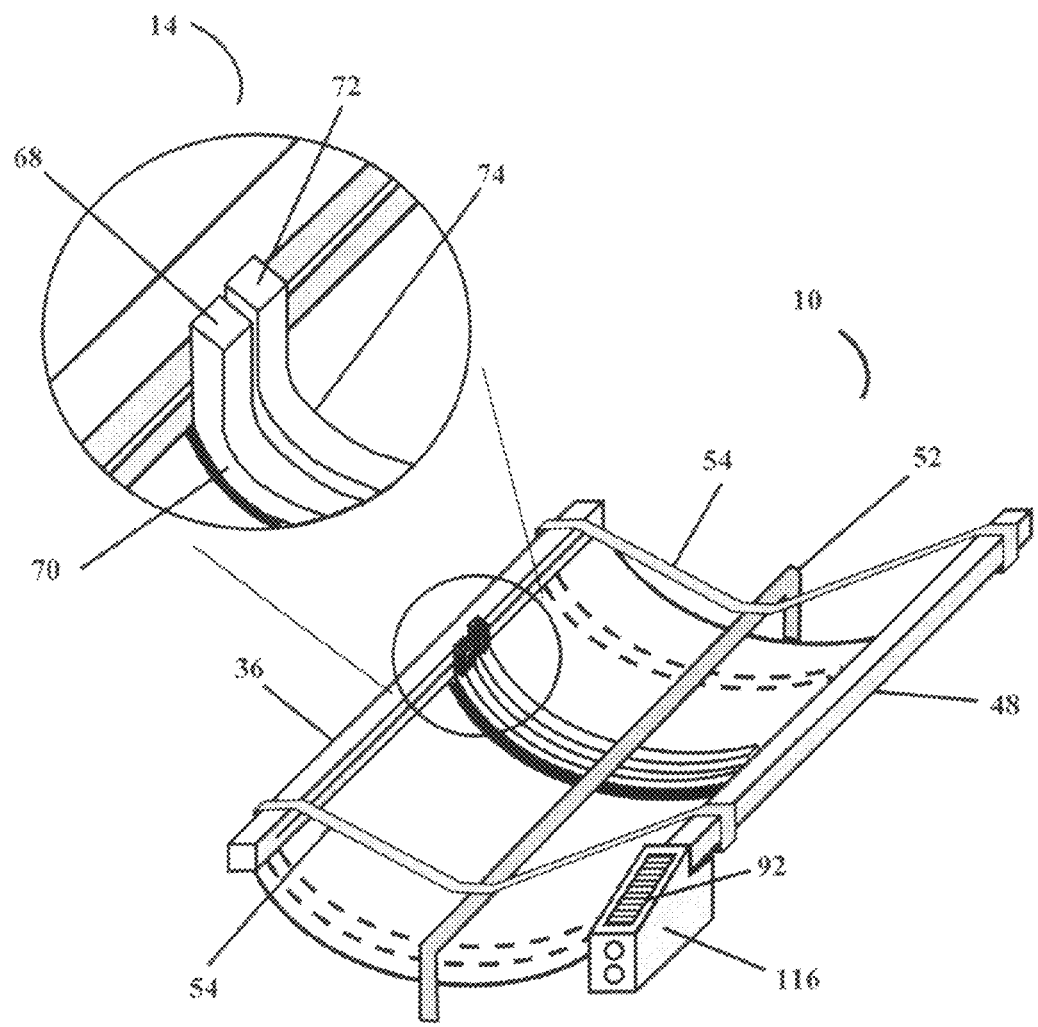
FIG. 3 is a perspective view of a single drive cleaning device mounted on a curved reflector panel.
Figure 4:
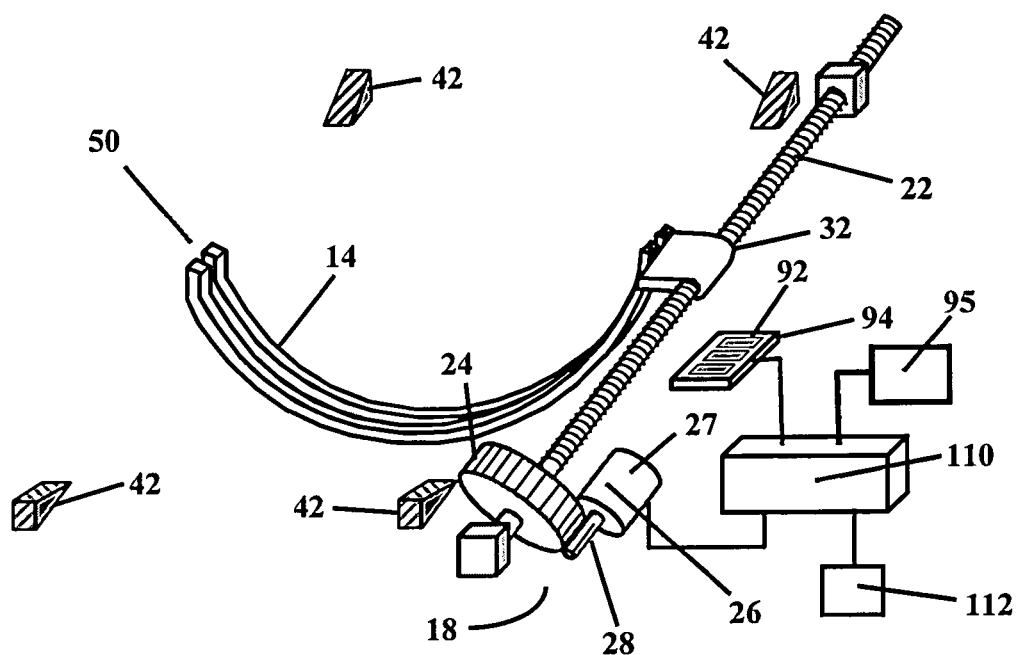
FIG. 4 is a schematic illustration of a single drive cleaning device for a curved reflector panel.

Referring now to FIGS. 3 and 4, an alternative single drive assembly 18 includes one drive shaft 22. The cleaning member 14 is connected to the drive shaft 22 as described above for two drive shafts. The single drive shaft 22 is enclosed in a shaft enclosure 48. The cleaning member 14 includes a free end 50 which permits a lower cost assembly. All the other components are identical to that described above for the dual drive assembly.

Referring now to FIGS. 1 and 3, a collector tube 52 is positioned at the radiation focal point above the trough reflector, and is typically supported at each end of the trough reflector. As illustrated, for long reflector curved trough reflectors, the collector tube 52 may be optionally supported by a mounting strap 54.

2. Flat Solar Panels

Referring now to FIGS. 5, 6, 7, and 8, the device 10 is mounted over a flat solar panel 56. The flat solar panel 56 uses the device 10 that is essentially identical to that described above for the curved reflector panel 12. To permit movement in the one or two directions, the cleaning member 14 is movably mounted on a generally square or rectangular frame 16 so that it can move one or two directions similar to the device of FIGS. 1 and 2. The dimensions and shape of the frame 16 depend on the dimensions and shape of the solar panel 56 to be cleaned, although generally speaking the frame 16 is either square or rectangular. The frame 16 includes the drive assembly 18, which drives the cleaning member 14 across the solar panel 12 during a cleaning operation. In one example, the drive assembly 18 is a dual drive assembly and includes the two threaded drive shafts 20, 22, which are disposed substantially parallel to each other. The toothed gear wheel 24 is connected to one end of the drive shaft 22, although in some examples, two gear wheels can be connected, one on each of the drive shafts. The prime mover 26 such as the drive motor 27, includes the toothed portion 28 which meshes with the gear wheel 24 teeth to drive the gear wheel 24 and therefore the drive shaft 22. The cleaning member 14 includes two driven end portions 30, 32 which are mounted on each of the threaded drive shafts 20, 22 for movement therealong when the drive motor 26 is activated. The cross shafts 34 are connected between the two drive shafts 20, 22 to transfer rotation to the drive shaft 20 and add rigidity and stability to the drive assembly 18. The two drive shafts 20, 22 are respectively housed within the two shaft enclosures 36, 38, and the cross shafts 34 are housed within the cross shaft enclosure 40.

As with the curved reflector panel 12, the cleaning device 10 also includes spaced apart tilt ramps 42, which are located at either end of the frame 16. The tilt ramps 42 are wedges in which the thin ends are disposed towards the cleaning member 14 and contact the cleaning member 14 as it reaches the respective ends of the flat solar panel 56.

Figure 7:
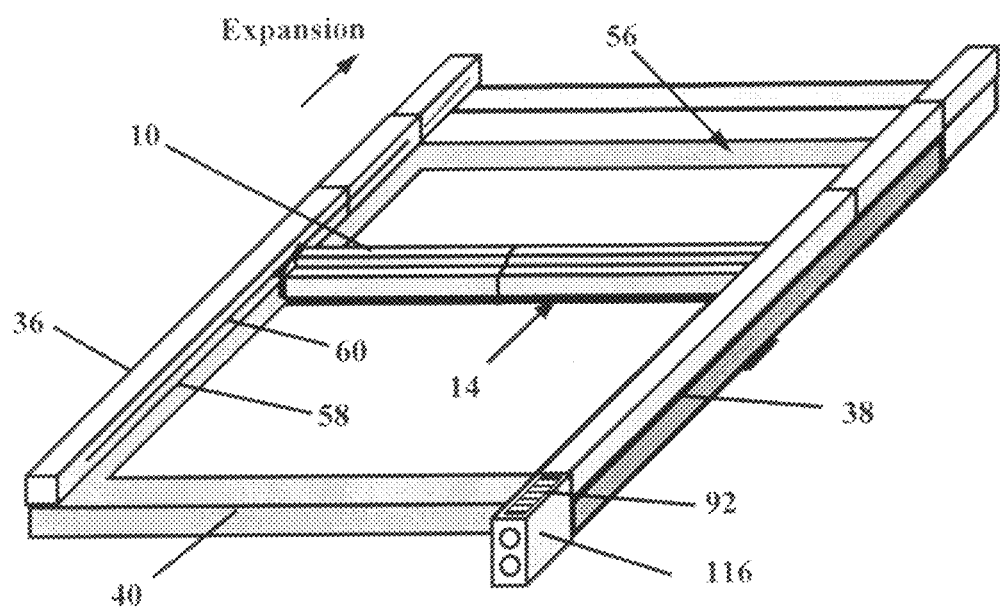
FIG. 7 is a perspective view of a single drive cleaning device mounted on a flat solar panel.
Figure 8:
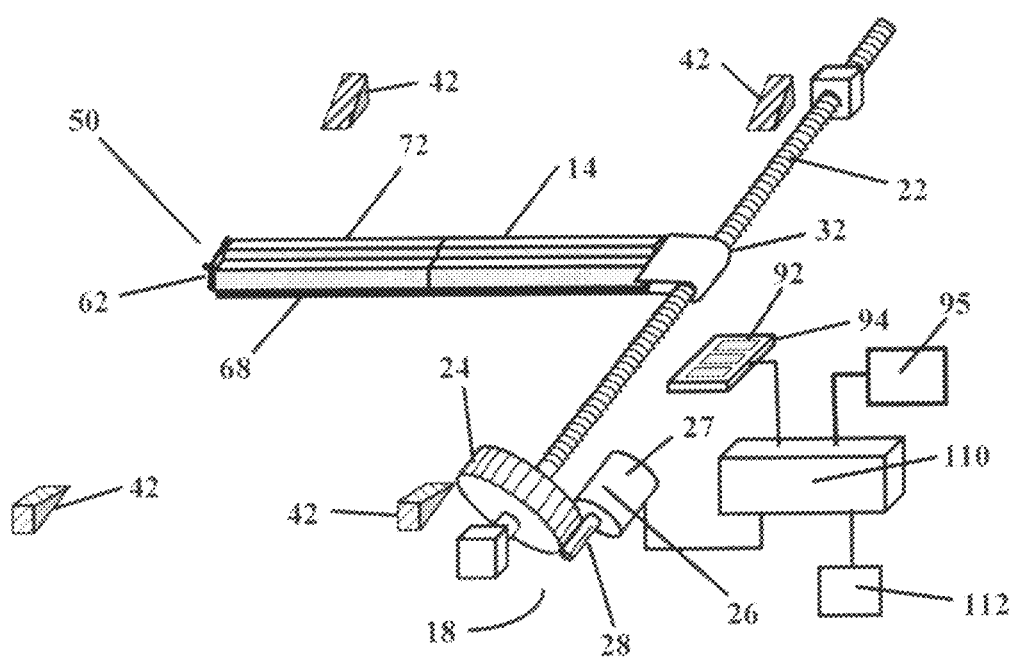
FIG. 8 is a schematic illustration of a single drive cleaning device for a flat solar panel.

Referring now to FIGS. 7 and 8, the single drive assembly 18 includes the single drive shaft 22. The cleaning member 14 is connected to the drive shaft 22 as described above for two drive shafts. The single drive shaft 22 is enclosed in the shaft enclosure 38. The cleaning member 14 includes the free end 50 which permits a lower cost assembly. A guide 58 is located substantially parallel to the drive shaft 22. The guide 58 includes a guide slot 60 which extends substantially the entire length of the guide enclosure 36. The cleaning member 14 includes a tongue 62, which extends away from one end adjacent the guide 58 for slidable engagement with the guide slot 60. Thus, the guide slot 60 provides a restraint to cleaning member 14 to ensure proper contact of the cleaning member 14 with the flat panel 56 surface.

3. Ramp Cleaner

Figure 5:
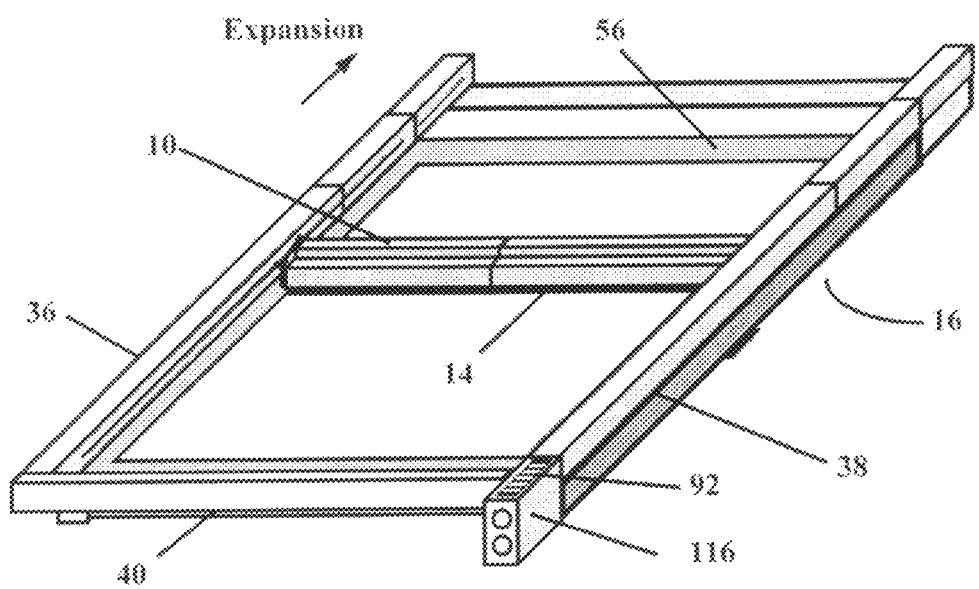
FIG. 5 is a perspective view of a dual drive cleaning device mounted on a flat solar panel.
Figure 6:
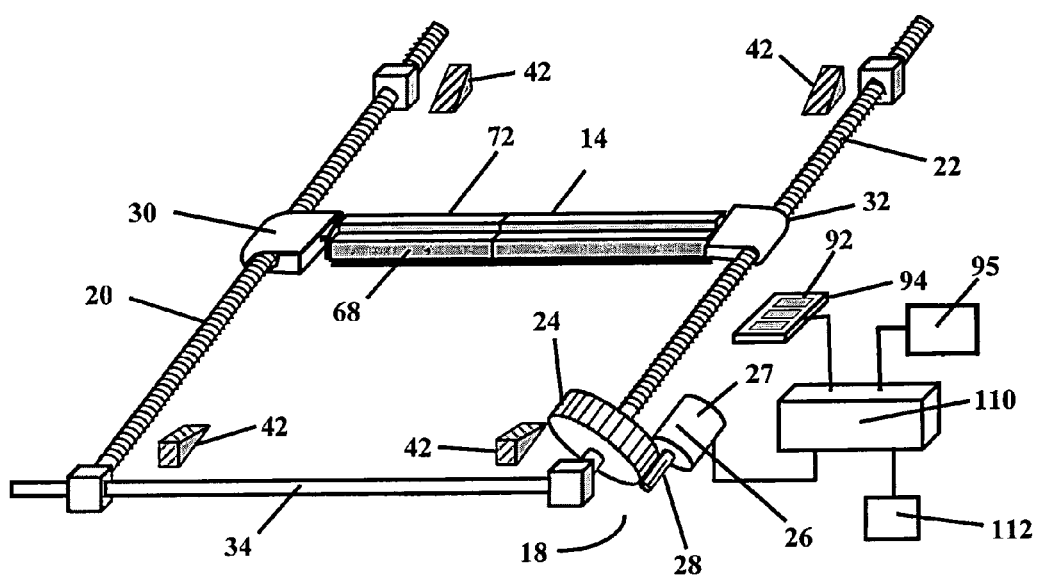
FIG. 6 is a schematic illustration of a dual drive cleaning device for a flat solar panel.

Referring now to FIGS. 1, 3, and 5, the cleaning member 14 includes a first cleaning portion 68 which is a sweeper 70 for sweeping the trough reflector 12 or the flat panel 56 as the cleaning member 14 moves in one direction. A second cleaning portion 72, which is a scraper 74 for scraping the trough reflector 12 or the flat panel 56 as the cleaning member 14 moves in the second, opposite direction.

Figure 9A:
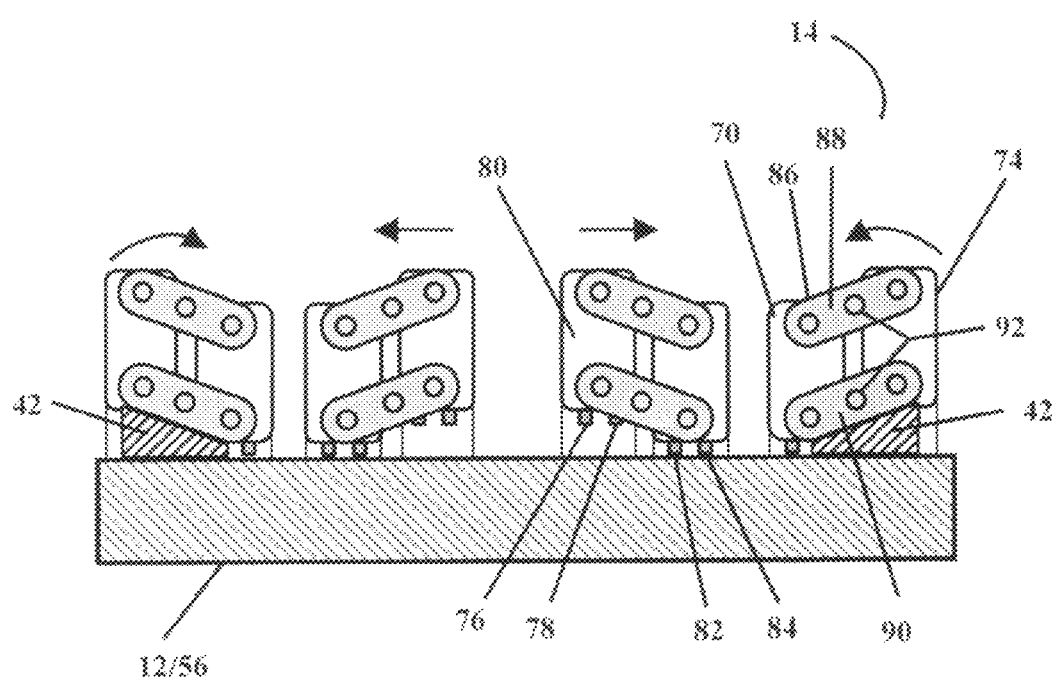
FIG. 9A illustrates the mechanism for exchanging ramp cleaning members in bi-directional cleaning operations.

Referring now to FIG. 9A, the sweeper 70 and the scraper 74 are spaced apart and extend from the cleaning member 14 towards the trough reflector 12 or the flat panel 56. The sweeper portion 70 includes one or more spaced apart pads and/or brushes 76 mounted on a body 80, whereas the scraper 74 includes two spaced apart wiper blades 82, 84. For ease of routine maintenance and replacement of worn parts, the pads and or brushes 76, 78 and the blades 82, 84 are detachable from the cleaning member 14. For use in unidirectional mode, the cleaning member includes a sweeper and a scraper to permit cleaning in a single pass over the curved trough reflector.

Figure 9B:
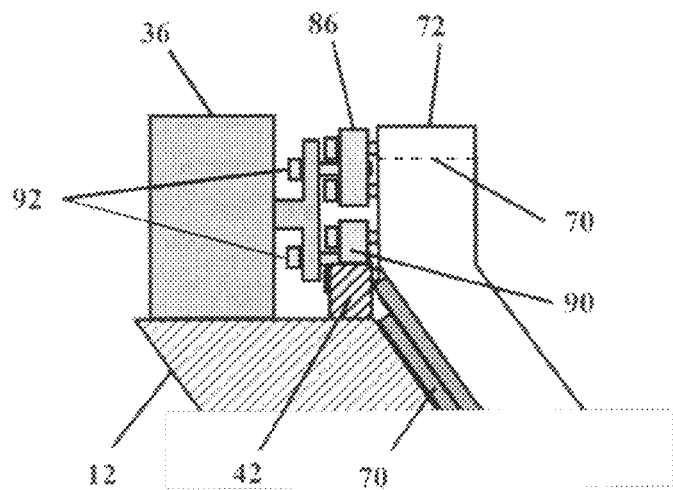
FIG. 9B is a detailed end view of the mechanism of FIG. 9A for a curved reflector panel.

Still referring to FIG. 9A and now FIG. 9B, a rocker bar 86 is connected to the sweeper portion 70 and the scraper portion 74 for rockingly moving either the sweeper portion 70 or the scraper portion 74 into contact with the trough reflector as the cleaning member 14 moves over the curved trough reflector 12. The rocker bar 86 includes an upper bar member 88 and a lower bar member 90 connected to the sweeper portion 70 and the scraper portion 74. Each rocker bar 86 has a rocker pin 92 about which the upper and lower rocker bars rockingly move. The cleaning member 14 moves over the trough reflector 12 along a path of travel which is restricted by the ramps 42 located at either end of the trough reflector 12 so that when the cleaning member 14 move along over the trough reflector 12, either of the scraper portion 74 or the sweeper portion 70 moves up the respective ramps 42. The ramps 42 force the cleaning member 14 to tilt so that either the scraper portion 72 or the sweeper portion 70 contacts the curved trough reflector 12.

Unidirectional movement of the cleaning member is abbreviated to avoid contacting the ramps so that the scraper portion is always in contact with the trough reflector.

Still referring to FIG. 9A, the combination of sweeper portion 70, the scraper portion 74, and rocker bars 86 form a parallelogram such that when, for example, the scraper portion 74 rides up the right hand ramp 42, losing contact with curved reflector trough reflector 12, the rocker bar 86 moves the sweeper portion 70 down to contact the curved reflector panel 12. The left hand ramp 42 similarly moves the sweeper and scraper portions 74, 70 into contact with the curved reflector panel 12.

Figure 10:
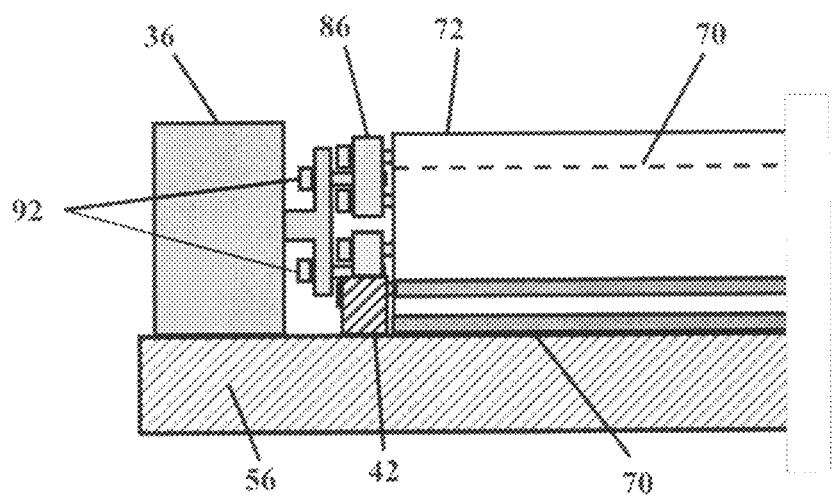
FIG. 10 is a detailed end view of the mechanism of FIG. 9A for a flat solar panel.

Referring to FIG. 10, the cleaning member 14 is illustrated in use with the flat solar panel 56.

4. Sensor

Figure 11:
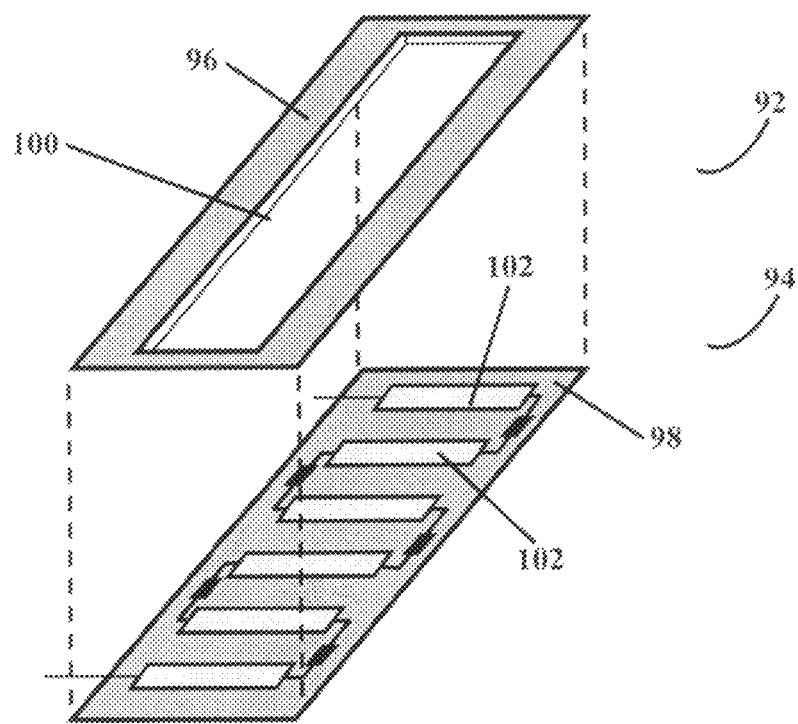
FIG. 11 is an exploded perspective view of a rain intensity sensor.
Figure 12:
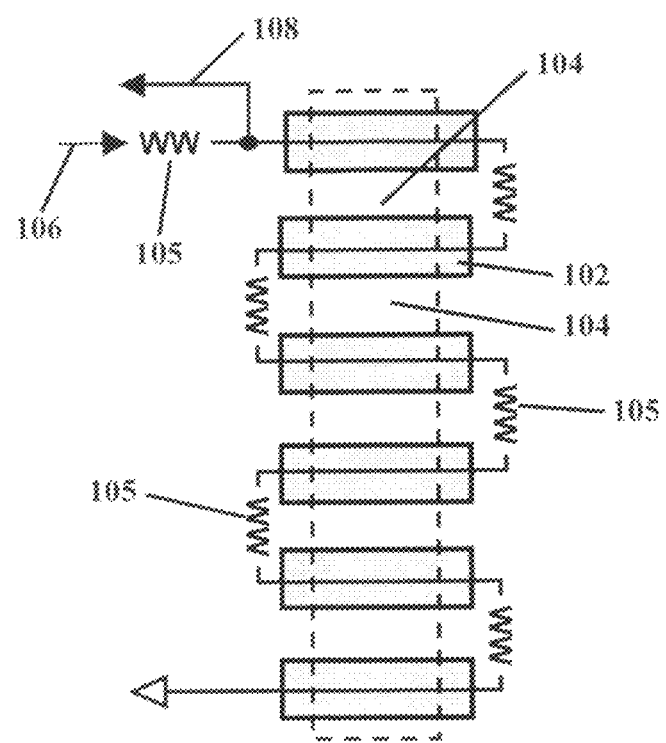
FIG. 12 is a circuit diagram of the rain intensity sensor.

Referring now to FIGS. 11 and 12, a moisture intensity sensor 92 is in communication with the cleaning member 14 for its operation. For most applications, a single moisture intensity sensor 92 is sufficient for one or more panels, especially when the device 10 is used in solar or trough reflector parks. The moisture intensity sensor 92 is typically located adjacent or near the curved trough reflector 12 or it can be integrated into the panel. The moisture intensity sensor 92 is a rain sensor 94. The rain sensor 94 detects the presence of adequate rain intensity, which the cleaning device 10 uses to effectively clean the curved trough reflector 12. The sensor 94 is tilted at an angle that allows raindrops to run from top to bottom thereof. The sensor 94 includes a sensor cover 96 located over a sensor circuit 98 and includes a gasket 100 to prevent lateral leakage of the rain water. The sensor circuit 98 includes a plurality of foil strips 102 which are spaced apart to define a plurality of gaps 104 (also known as exposed sensor areas) that are less than a raindrop splatter size. The strips 102 are typically made from aluminum foil, although any electrically conductive foil material will work. The strips 102 are electrically connected in series and include a plurality of resistors (RN) 105. The circuit 98 is grounded. A reference voltage 106 is applied to the sensor. A signal voltage 108 for a dry sensor is compared with the signal voltage 108 generated when a raindrop splatter falls onto one or more of the gaps 104. If the raindrops are infrequent, not all gaps 104 between the foil strips 102 will be bridged with raindrop water. The resistance of any bridged gap 104 will reduce to the parallel resistance of RN and the water resistance. Since heavier rain will cause more gaps to be bridged, the sensor resistance is a measure of rain intensity.

5. System

Referring now to FIGS. 2, 4, 6, and 8, a controller 110 is connected to the moisture intensity sensor 92. The controller 110 and the moisture sensor 92 are powered by an autonomous power supply 112 and/or a user supply power. In one example, the autonomous power supply 112 is a photovoltaic cell. A temperature sensor (not shown) is electrically connected to the controller 110. The controller 110, the moisture intensity sensor 92, the gear wheel 24 and the motor 26 can all be located in a single housing 116 located near one end of the drive shaft 22. The controller 110, temperature sensor, and moisture intensity sensor 92 may also be located off the panel 12 and connected to the panel output and drive motors 26 of a plurality of panels 12.

Figure 13:
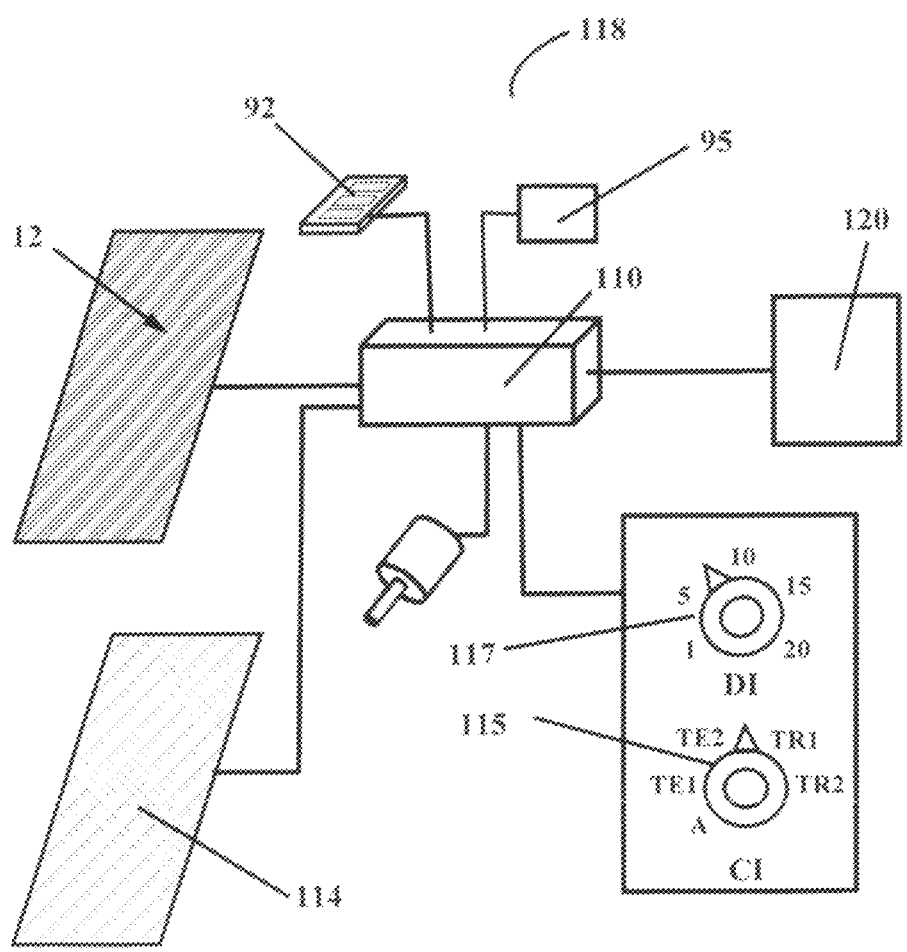
FIG. 13 is a schematic representation of a trough reflector cleaning system

Referring still to FIGS. 2, 4, 6, and 8, and now FIG. 13, a system 118 for autonomously cleaning a trough reflector 12 includes the moisture intensity sensor 92, the temperature sensor 95, the controller 110, which is in communication with the sensor 92; and the cleaning member 14 which is in communication with the controller 110. In multiple panel installations, one or more co-power panels 114 may be connected to controller 110 to support autonomous operation. A 12 volt converter or battery 120 is optionally connected to the controller 110, and is user powered such as by a remotely controllable independent power supply or charger. The system 118 is configured such that in response to an amount of rain being detected on the moisture intensity sensor 92, the controller 110 activates the cleaning member 14 such that the cleaning member 14 moves in the first direction and the sweeper 70 sweeps the trough reflector 12, and then the cleaning member 14 stops. For bi-directional cleaning, the cleaning member axially rotates about its restricted path of travel so that the scraper 74 is brought into contact with the trough reflector 12 and the scraper 74 scrapes the trough reflector 12 as the cleaning member 14 moves in the second direction. The system 118 is also operable with flat solar panels 56.

Operation

Using the dual drive shaft curved reflector panel assembly and bi-directional cleaning as an example, the operation of the cleaning device 10 and system 118 will now be described with reference to FIGS. 1, 9A, 9B and 13. A bi-directional cleaning cycle begins with the cleaning member 14 moving from a first end to a second of the trough reflector 12 with the sweeper portion 70 sweeping the trough reflector cover surface. At the second end of the trough reflector 12, the cleaning member 14 rides up the ramps 42 and forces the rocker bars 86 to rockingly move axially so that the scraper portion 74 is pressed against the panel surface. As the cleaning member 14 moves from the second end to the first end, the scraper 74 squeegees off the remaining surface dirt/precipitation. At the first end, the cleaning member 14 contacts the bottom ramps 42 so that the rocker bars 86 rockingly move thereby bringing the sweeper 70 back into contact with the panel surface. The controller 110 determines if sufficient precipitation is present to autonomously commence the cleaning cycle. If desired, the cleaning cycle can include several movements of the cleaning member 14 across the trough reflector 12 or can include a single movement in each of the two directions. The number of cleaning cycles can be pre-selected depending on the needs of the park operator, for example. The device 10 includes a climate index setting control (dial) 115 on the controller 110 that can be manually adjusted for differing weather environments to effectively tailor the cleaning program to match the environmental conditions and geographic locations. The climate index dial 115 is effectively a weather dial that has manual settings to identify climatic environments, which may vary from arid to temperate to tropical weather conditions. The device 10 includes another manual setting dial 117 with regard to dirt and dust whereby the dirt index that ranges from, for example 1 to 20, communicates with the controller for scheduling the cleaning member in environments that have varying degrees of airborne dirt particles that may affect the cleaning cycle regardless of precipitation. The controller 110 can address and effectively clean a trough reflector 12 in environments with significant or minimal precipitation whereby scheduled cleanings are done if programmed off times have elapsed since the last cleaning. The controller 110 can sense the availability of external power and schedule nighttime cleaning cycles to take advantage of nighttime rain or morning dew.

In certain circumstances, such as diminished solar power output, diminished rainfall, or in less dirty environments, cleaning can be effected using only one direction cleaning. This uni-directional cleaning is sufficient to clean the trough reflector after one pass thereover and reduces the need for the bi-directional cleaning cycle.

As described herein, the device 10 can be easily installed on existing solar or trough reflector panels via mounting straps on the back of the panels whereby the device can be attached to the top, sides or bottom of the outside frame of the panel. Furthermore, the device 10 can be made to accommodate thin film panels that may be curved.

Generally speaking, the device 10 can be produced in a range of sizes. The device 10 can be cost effectively incorporated into the design and manufacturing of a production panel by a person skilled in the art.

In the event that there is no moisture present in the environment where the device 10 is located for an extended period of time, the device 10 would still sweep the panel for dirt particles and debris when the arid climate setting is active, the dirt index is high and sufficient power is available. In such circumstances, the user may elect to install replaceable clear protective film on the panel cover.

Although the above description relates to a specific embodiment as presently contemplated by the inventor, it will be understood that the device in its broad aspect includes mechanical and functional equivalents of the elements described herein.

We claim:

1. A cleaning device for a curved panel, the device comprising:
    a curved cleaning member having a sweeper portion and a scraper portion, the cleaning member being mounted for unidirectional and bidirectional movement over the curved panel; and
    a rocker bar connected to the sweeper portion and the scraper portion for rockingly moving either the sweeper portion or the scraper portion to place them into contact with the curved panel as the cleaning member moves over the curved panel.

2. The device, according to claim 1, in which the rocker bar includes an upper rocker bar and a lower rocker bar connected to the sweeper portion and the scraper portion, each rocker bar having a rocker pin about which the upper and lower rocker bars rockingly move.

3. The device, according to claim 1, in which the cleaning member moves over the panel along a restricted path of travel.

4. The device, according to claim 1, further includes at least two spaced apart ramps.

5. The device, according to claim 4, in which the either of the scraper portion or the sweeper portion cleaning member moves up the respective ramps when the cleaning member moves unidirectionally or bidirectionally, the ramps forcing the cleaning member to alternately lift and lower the scraper or sweeper portions so that either the scraper portion or the sweeper portion contacts the curved panel.

6. The device, according to claim 5, in which unidirectional movement of the cleaning member is abbreviated to avoid contacting the ramps so that the scraper portion is always in contact with the curved panel.

7. The device, according to claim 1, in which the cleaning member is movably mounted on the sides of a frame.

8. The device, according to claim 7, in which the frame includes a drive assembly to drive the cleaning member across the curved panel.

9. The device, according to claim 8, in which the drive assembly includes:
a) at least one drive shaft;
b) a gear connected to the drive shaft; and
c) a prime mover connected to the gear.

10. The device, according to claim 9, in which the drive assembly includes one drive shaft in a shaft enclosure.

11. The device, according to claim 9, in which the drive assembly includes a guide having a guide slot therein, the guide being located substantially parallel to the drive shaft.

12. The device, according to claim 8, in which the drive assembly includes two drive shafts disposed substantially parallel to each other.

13. The device, according to claim 12, in which the two drive shafts are respectively enclosed in two shaft enclosures.

14. The device, according to claim 12, in which a cross shaft connects the two drive shafts.

15. The device, according to claim 1, further includes one or more mounting straps and a mounting buckle or a clamp for locating the device over the panel.

16. The device, according to claim 1, in which a moisture intensity sensor is in communication with the cleaning member, the moisture intensity sensor being located adjacent the panel or integral therewith.

17. The device, according to claim 16, in which the moisture intensity sensor is a rain sensor.

18. The device, according to claim 17, in which the rain sensor includes a sensor circuit with a plurality of spaced apart strips connected in series, and a plurality of resistors connected to the strips, a reference voltage being in communication with the circuit for comparing with a signal voltage generated when a raindrop falls onto one or more of the spaced apart gaps; the circuit being configured such that heavier rain will cause the raindrops to bridge more gaps thereby permitting the sensor resistance to measure the rain intensity.

19. The device, according to claim 1, in which a temperature sensor is in communication with the cleaning member, the temperature sensor being located adjacent the panel.

20. The device, according to claim 1, in which a controller is connected to a moisture intensity sensor and a temperature sensor, the controller being powered by a power supply.

21. The device, according to claim 20, in which the power supply is an autonomous power supply.

22. The device, according to claim 21, in which the autonomous power supply is a photovoltaic cell array or a trough reflector panel or a battery or user supplied power.

23. The device, according to claim 1, is located on a pedestal or frame.

24. The device, according to claim 1, is mounted on the roof, the side of a building or on the ground.

25. The device, according to claim 1, is connected to a washing system for spraying a liquid on a curved panel or allowing collected rainwater from drainage channels along a frame to be implemented.

26. The device, according to claim 1, in which the panel is a curved trough reflector panel.

27. The device, according to claim 1, is incorporated into a production design.

28. A cleaning device for a curved trough reflector panel, the device comprising:
a curved cleaning member having a sweeper portion and a scraper portion, the cleaning member being mounted for unidirectional and bidirectional movement over the curved reflector panel; and
a rocker bar connected to the sweeper portion and the scraper portion for rockingly moving either the sweeper portion or the scraper portion to place them into contact with the curved reflector panel as the cleaning member moves over the curved reflector panel.

29. The device, according to claim 28, in which the rocker bar includes an upper rocker bar and a lower rocker bar connected to the sweeper portion and the scraper portion, each rocker bar having a rocker pin about which the upper and lower rocker bars rockingly move.

30. The device, according to claim 28, in which the cleaning member moves over the curved reflector panel along a restricted path of travel.

31. The device, according to claim 28, further includes at least two spaced apart ramps.

32. The device, according to claim 31, in which either of the scraper portion or the sweeper portion cleaning member moves up the respective ramps when the cleaning member moves unidirectionally or bidirectionally, the ramps forcing the cleaning member to alternately lift and lower the scraper or sweeper portions so that either the scraper portion or the sweeper portion contacts the curved panel.

33. The device, according to claim 32, in which unidirectional movement of the cleaning member is abbreviated to avoid contacting the ramps so that the scraper portion is always in contact with the curved reflector panel.

34. The device, according to claim 31, in which the either of the scraper portion or the sweeper portion cleaning member moves up the respective ramps when the cleaning member moves unidirectionally the ramps forcing the cleaning member to alternately lift and lower the scraper or sweeper portions so that either the scraper portion or the sweeper portion contacts the curved reflector panel.

35. The device, according to claim 34, in which unidirectional movement of the cleaning member is abbreviated to avoid contacting the ramps so that the scraper portion is always in contact with the curved reflector panel.

36. The device, according to claim 35, in which the frame includes a drive assembly to drive the cleaning member across the curved reflector panel.

37. The device, according to claim 36, in which the drive assembly includes:
  a) at least one drive shaft;
  b) a gear connected to the drive shaft; and
  c) a prime mover connected to the gear.

38. The device, according to claim 37, in which the drive assembly includes one drive shaft in a shaft enclosure.

39. The device, according to claim 36, in which the drive assembly includes two drive shafts disposed substantially parallel to each other.

40. The device, according to claim 39, in which the two drive shafts are respectively enclosed in two shaft enclosures.

41. The device, according to claim 39, in which a cross shaft connects the two drive shafts.

42. The device, according to claim 37, in which the drive assembly includes a guide having a guide slot therein, the guide being located substantially parallel to the drive shaft.

43. The device, according to claim 28, in which the cleaning member is movably mounted on the sides of a frame.

44. The device, according to claim 43, in which the frame includes a drive assembly to drive the cleaning member across the curved reflector panel.

45. The device, according to claim 44, in which the drive assembly includes:
  a) at least one drive shaft;
  b) a gear connected to the drive shaft; and
  c) a prime mover connected to the gear.

46. The device, according to claim 45, in which the drive assembly includes one drive shaft in a shaft enclosure.

47. The device, according to claim 45, in which the drive assembly includes a guide having a guide slot therein, the guide being located substantially parallel to the drive shaft.

48. The device, according to claim 44, in which the drive assembly includes two drive shafts disposed substantially parallel to each other.

49. The device, according to claim 48, in which the two drive shafts are respectively enclosed in two shaft enclosures.

50. The device, according to claim 48, in which a cross shaft connects the two drive shafts.

51. The device, according to claim 28, further includes one or more mounting straps and a mounting buckle or a clamp for locating the device over the curved reflector panel.

52. The device, according to claim 28, in which a moisture intensity sensor is in communication with the cleaning member, the moisture intensity sensor being located adjacent the curved reflector panel or integral therewith.

53. The device, according to claim 52, in which the moisture intensity sensor is a rain sensor.

54. The device, according to claim 53, in which the rain sensor includes a sensor circuit with a plurality of spaced apart strips connected in series, and a plurality of resistors connected to the strips, a reference voltage being in communication with the circuit for comparing with a signal voltage generated when a raindrop falls onto one or more of the spaced apart gaps; the circuit being configured such that heavier rain will cause the raindrops to bridge more gaps thereby permitting the sensor resistance to measure the rain intensity.

55. The device, according to claim 28, in which a temperature sensor is in communication with the cleaning member, the temperature sensor being located adjacent the curved reflector panel.

56. The device, according to claim 28, in which a controller is connected to a moisture intensity sensor and a temperature sensor, the controller being powered by a power supply.

57. The device, according to claim 56, in which the power supply is an autonomous power supply.

58. The device, according to claim 57, in which the autonomous power supply is a photovoltaic cell array or trough reflector panel or a battery or user supplied power.

59. The device, according to claim 28, is located on a pedestal or frame.

60. The device, according to claim 28, is mounted on the roof, the side of a building or on the ground.

61. The device, according to claim 28, is connected to a washing system for spraying a liquid on the curved reflector panel or allowing collected rainwater from drainage channels along a frame to be implemented.

62. The device, according to claim 28, in which the cleaning member is curved to be complimentary to the curvature of the curved reflector panel.

63. The device, according to claim 28, includes a collector tube mounted over the curved reflector panel.

64. The device, according to claim 28, is incorporated into a production design.

65. A cleaning device for a curved reflector panel, the device comprising:
  a curved cleaning member mounted for unidirectional movement over the curved reflector panel, the cleaning member having a sweeper portion for cleaning the curved reflector panel as the cleaning member moves unidirectionally along a restricted path of travel over the curved reflector panel; and
  a rocker bar connected to the sweeper portion for rockingly moving the sweeper portion to place it into contact with the curved panel as the cleaning member moves over the curved panel.

66. The device, according to claim 65, in which the rocker bar includes an upper rocker bar and a lower rocker bar connected to the sweeper portion, each rocker bar having a rocker pin about which the upper and lower rocker bars rockingly move.

67. The device, according to claim 65, in which the cleaning member moves over the curved reflector panel along a restricted path of travel.

68. The device, according to claim 65, further includes at least two spaced apart ramps.

69. The device, according to claim 65, in which the cleaning member is movably mounted on the sides of a frame.

70. The device, according to claim 65, further includes one or more mounting straps and a mounting buckle or a clamp for locating the device over the curved reflector panel.

71. The device, according to claim 65, in which a moisture intensity sensor is in communication with the cleaning member, the moisture intensity sensor being located adjacent the curved reflector panel or integral therewith.

72. The device, according to claim 71, in which the moisture intensity sensor is a rain sensor.

73. The device, according to claim 69, in which the rain sensor includes a sensor circuit with a plurality of spaced apart strips connected in series, and a plurality of resistors connected to the strips, a reference voltage being in communication with the circuit for comparing with a signal voltage generated when a raindrop falls onto one or more of the spaced apart gaps; the circuit being configured such that heavier rain will cause the raindrops to bridge more gaps thereby permitting the sensor resistance to measure the rain intensity.

74. The device, according to claim 65, in which a temperature sensor is in communication with the cleaning member, the temperature sensor being located adjacent the curved reflector panel.

75. The device, according to claim 65, in which a controller is connected to a moisture intensity sensor and a temperature sensor, the controller being powered by a power supply.

76. The device, according to claim 75, in which the power supply is an autonomous power supply.

77. The device, according to claim 76, in which the autonomous power supply is a trough reflector or a solar panel or a battery or user supplied power.

78. The device, according to claim 65, is located on a pedestal or frame.

79. The device, according to claim 65, is mounted on the roof, the side of a building or on the ground.

80. The device, according to claim 65, is connected to a washing system for spraying a liquid on the curved reflector panel or allowing collected rainwater from drainage channels along a frame to be implemented.

81. The device, according to claim 65, in which the cleaning member is curved to be complimentary to the curvature of the curved reflector panel.

82. The device, according to claim 65, includes a collector tube mounted over the curved reflector panel.

83. The device, according to claim 65, is incorporated into a production design.

84. A system for autonomously cleaning a curved reflector panel, the system comprising:
    a moisture intensity sensor;
    a temperature sensor;
    a controller in communication with the sensors; and
    a curved cleaning member mounted for unidirectional movement or bidirectional movement over the curved reflector panel, the cleaning member being in communication with the controller, the cleaning member having a sweeper portion and a scraper portion, the system being configured such that in response to an amount of moisture being detected on the moisture intensity sensor the controller activates the cleaning member such that:
    i) the cleaning member moves unidirectionally and the sweeper portion cleans the curved reflector panel; or
    ii) the cleaning member moves bidirectionally and the sweeper portion cleans the curved reflector panel; and the cleaning member alternately lift and lower the scraper portion so that the scraper portion is brought into contact with the curved reflector panel and the scraper portion cleans the curved reflector panel.

85. The system, according to claim 84, further includes a dirt index dial and a climate index dial.

86. A system for autonomously cleaning a curved reflector panel, the system comprising:
    a moisture intensity sensor;
    a temperature sensor;
    a controller in communication with the sensors; and
    a curved cleaning member mounted for movement in one direction over the curved reflector panel, the cleaning member being in communication with the controller, the cleaning member having a sweeper portion, the system being configured such that in response to an amount of moisture being detected on the moisture intensity sensor, the controller activates the cleaning member such that the cleaning member moves in the one direction along a restricted path of travel and the sweeper cleans the curved reflector panel.

87. The system, according to claim 86, further includes a dirt index dial and a climate index dial.

\* \* \* \* \*